United States Patent [19]

Beatty

[11] 4,255,499
[45] Mar. 10, 1981

[54] HIGH PRESSURE SAFETY VENT FOR GALVANIC DRY CELLS

[75] Inventor: Theodore R. Beatty, Bay Village, Ohio

[73] Assignee: Union Carbide Corporation, New York, N.Y.

[21] Appl. No.: 130,262

[22] Filed: Mar. 14, 1980

[51] Int. Cl.³ .............................................. H01M 2/12
[52] U.S. Cl. ....................................... 429/54; 429/56
[58] Field of Search .................................... 429/54, 56

[56] References Cited

U.S. PATENT DOCUMENTS

| | | | |
|---|---|---|---|
| 2,881,368 | 4/1959 | Hancock | 429/54 |
| 3,256,117 | 6/1966 | Howatt et al. | 429/54 |
| 3,355,329 | 11/1967 | Wilke et al. | 429/54 |
| 3,494,801 | 2/1970 | Urry | 429/54 |
| 4,020,241 | 4/1977 | Heinz | 429/54 |
| 4,063,902 | 12/1977 | Heinz | 29/623.2 |
| 4,079,172 | 3/1978 | Potts et al. | 429/54 |

Primary Examiner—Donald L. Walton
Attorney, Agent, or Firm—Cornelius F. O'Brien

[57] ABSTRACT

Radially sealed galvanic dry cells having a safety high pressure vent means comprising the crimping of an arc portion between about 150° and 190° of the top edge of the container over the cell closure means so that after a predetermined high internal gas pressure build up, the gas will tip the closure means and produce a vent passage between the cell's container and closure means proximal the remaining arc portion of the top edge of the container.

6 Claims, 10 Drawing Figures

HIGH PRESSURE SAFETY VENT FOR GALVANIC DRY CELLS

FIELD OF THE INVENTION

This invention relates to radially sealed cylindrical galvanic cells, and more particularly to a high pressure venting means for releasing high excessive gas pressure from inside the cells.

BACKGROUND OF THE INVENTION

Galvanic cells may generate large quantities of gas under certain conditions during use. Since these cells are required to be tightly sealed at all time in order to prevent loss of electrolyte by leakage, high internal gas pressures may develop. Such pressures may cause leakage, bulging or possible explosion of the cell if not properly vented. If a vent valve is employed, it generally is resealable in order to avoid drying out of the electrolyte over the life of the cell and to prevent ingress of oxygen from the atmosphere which can cause wasteful corrosion of the anode.

In the past several different types of resealable pressure relief vent valves have been used for releasing high internal gas pressures from inside a sealed galvanic cell. One type of valve that has been commonly used consists basically of a valve member, such as a flat rubber gasket, which is biased into a sealing position over a vent orifice by means of a resilient member, such as a helical spring. The resilient member or spring is designed to yield at a certain predetermined internal gas pressure so as to momentarily relieve the seal and allow the gas to escape through the vent orifice.

Another type of resealable vent is disclosed in U.S. Pat. No. 3,451,690 to Richman issued on Dec. 10, 1968. In this vent, a flat elastomeric seal gasket overlies the vent opening and is retained in place by a resilient terminal cap on the top of the cell. This vent operates in basically the same manner as the vents previously described.

In U.S. Pat. No. 3,664,878 to Amthor issued on May 23, 1972, a resealable vent is disclosed which comprises a resilient deformable ball of elastomeric material positioned to overlie a vent orifice provided within the cell's container. A retainer means is positioned over the resilient ball for maintaining the ball in place over the vent orifice and in contact with a valve seat provided around the peripheral edge portions of the vent orifice and for compressing and deforming the resilient ball into a flattened configuration forming a normally fluid-tight seal between the flattened ball and the valve seat. The resilient ball is capable of undergoing further temporary deformation upon the buildup of a predetermined high internal gas pressure inside the container so as to momentarily break the seal and allow gas to escape through the vent orifice.

A major problem encountered with resealable pressure relief vent valves of the types just described is that they are bulky and/or difficult to incorporate into the cell assembly. Furthermore, these pressure relief vent valves are expensive to manufacture and most are not adaptable for incorporation into miniature size cells. In addition, some of the prior art resealable vents as exemplified by the foregoing patents are not suitable for low pressure venting.

Alternates to high pressure resealable vent means are fail safe venting systems as illustrated in U.S. Pat. Nos. 3,218,197 and 3,314,824. Specifically in the '197 patent a venting means is disclosed in which the seal gasket has a thin section that will rupture or "blow-out" at a predetermined high pressure buildup within the cell. The difficulty with this type of venting means is that for small diameter cells it is difficult to obtain consistency in the thickness of the "blow-out" section of the gasket using conventional manufacturing techniques. In the '824 patent a puncture-type safety seal is disclosed which comprises a spring washer positioned within the cell's seal assembly and a radially acting toothed puncture washer. The teeth of the washer slide relative to the spring washer when the spring washer is subjected to internal pressure so that at a predetermined gas pressure buildup, the teeth of the washer will puncture the seal's gasket thereby providing a vent passage. This type of venting means requires several component parts, is rather expensive to make and assemble, and is not suitable for small diameter cells.

An inexpensive low pressure resealable vent closure is disclosed in U.S. Pat. Nos. 4,020,241 and 4,063,902 filed in the name of Henry Heinz, Jr. Specifically, a galvanic cell is disclosed having a resealable vent closure consisting of a resilient elastomeric sponge gasket disposed and compressed between the cover of the cell and the upper wall of the cell's container and designed to vent low pressure gas buildup along the cover-gasket interface and/or container-gasket interface.

U.S. Pat. No. 4,079,172 discloses sealed galvanic dry cells having at least one gas venting passage disposed at the interface of the top surface of the cover and then curled over rim of the container. The passage is defined as being a recess in the cover disposed below the curled over rim and/or a notch in a portion of the curled over rim.

As discussed above, resealable, high pressure relief vent valves are generally bulky and/or difficult to incorporate into a cell assembly, blow-out type safety vents are not suitable for small cell applications, while low pressure vent means for some cell systems may not adequately and sufficiently prevent loss of electrolyte through leakage or prevent ingress of oxygen from the atmosphere which could cause wasteful corrosion of the anode.

It is, therefore, an important object of this invention to provide a compact and economical high pressure vent for use in a galvanic cell.

Still another object of this invention is to provide a high pressure vent for galvanic cells which requires a small number of parts and which is, therefore, easy to assemble and inexpensive to manufacture.

Another object of this invention is directed to a galvanic cell in which a first arc portion between about 150° and 190° of the top peripheral edge of the container is turned or curled over the container's closure means so that when a predetermined high pressure build-up develops in the cell, the pressure will cause the closure means to tip or tilt about the diametral axis formed between the first arc portion and the remaining second arc portion so as to produce a vent passage at the interface of the container and the closure means proximal the remaining second arc portion of the top peripheral edge of the container.

The foregoing and additional objects will become more fully apparent from the following description and the accompanying drawings.

SUMMARY OF THE INVENTION

This invention relates to a galvanic cell comprising a container having an open end and an inner disposed active anode, active cathode, and electrolyte disposed within said container; a closure means for the container, said closure means comprising an annular cover disposed within an annular di-electric gasket having a U-shaped type cross section with the center of the gasket defining an opening; a current collector disposed through the central opening in the gasket and contacting an inner active member of the cell; and said container having an annular segment of its upper wall radially compressed against said cover via said gasket providing a seal thereat; and wherein the improvement is a first arc portion between about 150° and 190° of the top peripheral edge of the container defining the opening end curled over the gasket thereby further securing the closure means to the container along the first arc portion so as to enable a predetermined pressure within the cell to tip the closure means thereby producing a vent passage between the closure means and the container proximal the second arc portion of the top peripheral edge of the container while said closure means remains retained by said first arc portion.

In conventional type galvanic cells, the upper wall of the container is sealed to the cover of the cell using a radial and/or crimped sealing technique. In Leclanche, zinc chloride or other galvanic cells, there is usually a tendency to have gas buildup within the cell during storage and/or use. As stated above, in designing a cell with a low pressure venting system, although the gas will have a means for venting to the atmosphere, there is a tendency that air from the atmosphere may possibly leak into the cell, thus causing corrosion of the anode. In addition, in low pressure venting systems, there is also a tendency for the electrolyte to creep or leak from the cell which could cause damage to the instrument or device in which the cell is incorporated. To provide an improved seal for the cells, it has been found that an application of a sealant such as grease or asphalt can be applied to the interface of the upper portion of the inner container wall and the closure mans. This effectively seals the cells against low pressure leakage of electrolyte while simultaneously preventing the premature drying out of the liquid components of the cells.

It has been found that when the complete upper extremity of the container wall is turned over and onto the cover of the cell using conventional techniques, the seal obtained through the use of the sealant in combination with conventional radial and/or crimping sealing techniques is very effective. However, with the build up of gas pressure within the cell, the container wall may expand to relax the radial seal and the closure means is urged axially upward thereby securing and sealing the closure means of the cell to the upper turned over portion of the container wall, thus blocking any path for the gas to escape. As a result, with the increase of pressure buildup within the cell, the seal may become more effective against gas leakage. Although this sounds desirable, it has the effect that under abuse conditions, such as charging or high temperature environment, the gas pressure could continue to build up until it reaches a level where the closure means projects from the cell. This abusive use of the cell could damage the device in which the cell is used.

Although the cell of this invention is primarily intended as a sealed raw (unfirnished) cell which is to be assembled with similar cells within an outer container, any complete projection of the closure means from the cell could distort the outer container to a degree where it could possibly get lodged in the device in which it is assembled. In addition, any projecting of component parts out of the cell is usually accompanied by a relatively loud noise that could upset or even frighten the individual or individuals in close proximity to the container housing the cell. To prevent the possibility of such damage or noise from the release of high pressure buildup with a cell, the present invention is directed to a unique high pressure relief means that permits the closure means to tip or tilt about the diametral axis of the container after a predetermined high pressure buildup thereby providing a relief path. This will prevent the closure means from being completely projected out of the cell and at the same time effectively eliminate the noise usually accompanied by the projection of component parts from a cell.

In the preferred embodiment of this invention, the first arc portion of the top peripheral edge of the container that is curled over the closure means should be between about 170° and about 180° with about 180° being the most preferable. By axially securing the closure means to the open end of the container by curling an arc portion between about 150° and 190° of the top peripheral edge of the container over the closure means, the remaining arc portion of the peripheral edge of the container will not provide the same degree of axial restraint for the closure. The radial seal provided by radially compressing an annular segment of the wall of the container against the closure means will provide an admirable seal against low pressure build up within the cell. Thus the closure means of this invention is axially secured about a first portion of its peripheral segment so that after a predetermined high gas pressure buildup within the cell is developed, the force of the gas will tip or tilt the closure means about the diametral axis of the container whereby the first peripheral portion remains substantially axially secured while a vent passage is formed between the closure means and the container at the second peripheral portion of the closure means, that is, the portion that is not fully axially restrained by the edge of the container. Using the teachings of this invention, galvanic cells can be provided with an economical and reliable sealing and venting means without the addition of any new component parts.

The present invention will become more apparent from the following description thereof when considered together with the accompanying drawing which is set forth as being exemplary of the embodiments of the present invention and is not intended in any way to be limitative thereof and wherein.

Figure 1:
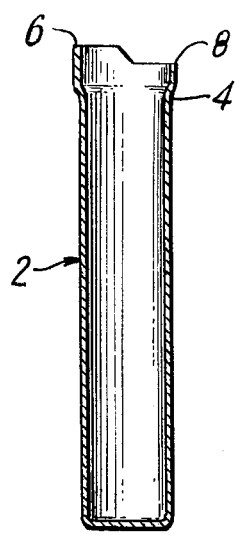
FIG. 1 is a sectional elevation taken through a container for use in this invention.
Figure 2:
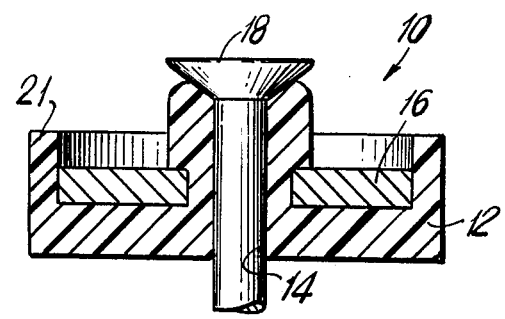
FIG. 2 is a sectional elevation taken through a closure means for use in this invention.
Figure 3:
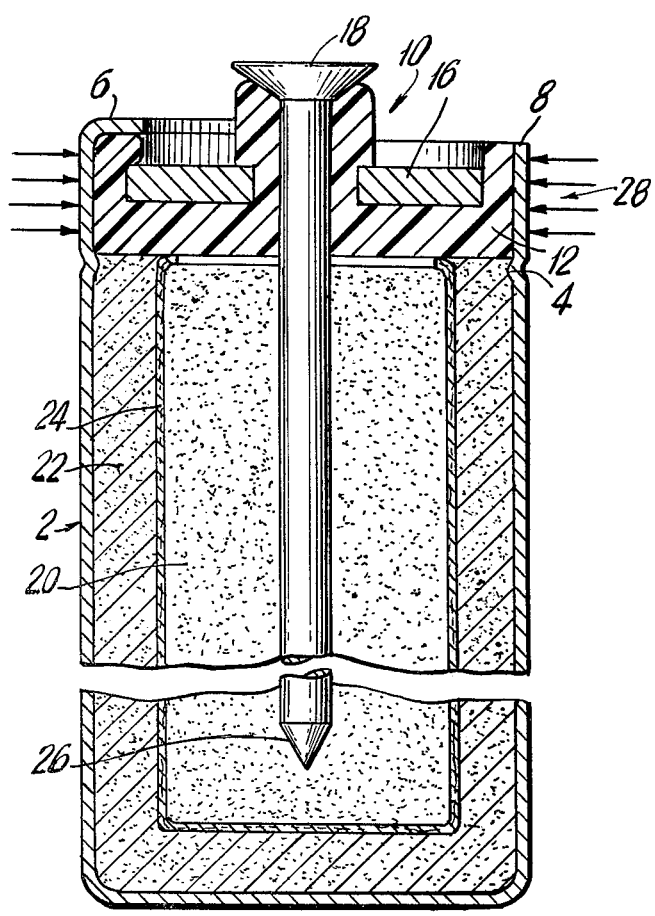
FIG. 3 is a sectional elevation of the container of FIG. 1 and the closure means of FIG. 2 shown assembled in a galvanic raw cell.

Referring in detail to FIGS. 1 and 3, there is shown a cylindrical cupped container 2 made of a material, such as steel, and having an expanded top portion which provides a annular flange with shoulder 4. A 180° arc portion 6 of the top peripheral edge of container 2 is extended above the remaining 180° arc portion 9. In FIG. 2 a closure means 10 is shown comprising an annular U-shaped gasket 12 made of material such as hard di-electric plastic and has a central aperture 14 therein. An annular apertured metallic cover 16 is recessed in the U-shaped gasket 12 and a conductive anode collector rod or pin 18, made of a material such as brass, passes through the apertures in gasket 12 and cover 16. The peripheral skirt 20 of gasket 12 extends above cover 16.

Figure 4:
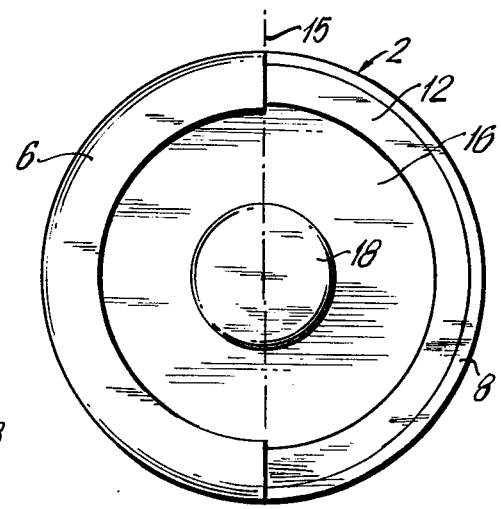
FIG. 4 is a plan view of the galvanic cell of FIG. 3.

FIG. 3 shows an assembled alkaline manganese dioxide-zinc raw cell comprising container 2 having disposed therein an anode mix 20 and cathode 22 separated by a separator 24. The anode mix 20 could comprise particulated zinc with a gelling agent and an electrolyte, such as aqueous potassium hydroxide. The cathode could comprise manganese dioxide and a conductive material, such as graphite. As shown in FIGS. 3 and 4, the closure means 10 of FIG. 2 is positioned within the open end of the container where the gasket 12 rests at least on shoulder 4. If desired, a layer of sealant may be disposed at the interface of the gasket and flange of the container. Upon inserting closure means 12 in container 2, anode collector rod 18 having a tapered end 26 is forced into anode mix 20 to make good contact therewith. Once the closure means 12 is seated within container 2, the annular segment 28 of container 2 is radially compressed against the gasket-cover-rod members thereby radially sealing the closure means 10 in the container as per the teaching of U.S. Pat. No. 3,069,489 which is incorporated herein by reference. The anode collector 18 is radially sealed in the closure means 10 per the teaching of U.S. Pat. No. 3,042,734 which is incorporated herein by reference. Specifically, this is accomplished by driving the tapered anode collector 18 with the cover 16 in place. The anode collector 18 is deliberately of a slightly larger diameter than the aperture 14 in gasket 12, so that when the tapered anode collector 18 is driven through the aperture 14 in gasket 12, the gasket 12 is radially compressed between the cover 16 and the anode collector 18, thereby furnishing an extremely tight mechanical seal at this area.

Figure 10:
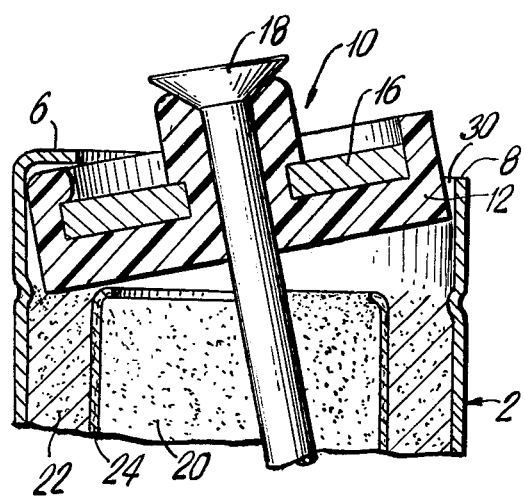
FIG. 10 is a sectional elevation of a galvanic cell after the closure means has been tipped or tilted to provide a vent passage in which gas buildup within the cell can escape.

After the closure means 10 is radially sealed in container 2, the arc portion 6 is curled and compressed over gasket 12 thereby axially retaining the closure means 10 within the container 2. As shown in FIG. 10, after a predetermined high internal pressure is developed, the pressure will act against the closure mans 10 and cause it to tip or tilt about diametral axis 15 (FIG. 4) thereby producing a vent passage 30 between the closure means 10 and container 2 at the arc portion 8. As stated above, the raw cell of this invention is primarily intended to be assembled in an outer multi-cell housing having sufficient space to accommodate tipping of the closure means and, therefore, the tipping of the closure means 10 will provide an excellent vent for high pressure gas from the cell while maintaining the cell encased in an outer multi-cell housing. Any escape of the electrolyte will be maintained within the outer cell housing and any distortion to the outer cell housing will be minimum, if at all.

Figure 5:
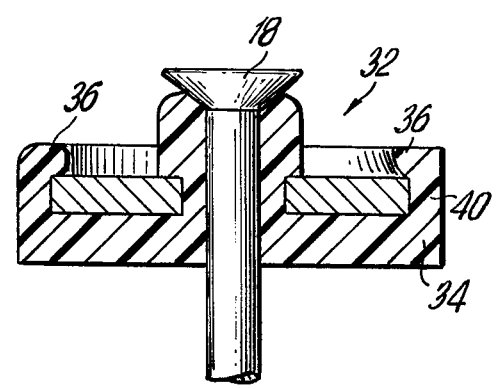
FIG. 5 is a sectional elevation taken through an alternative embodiment of a closure means for use in this invention.
Figure 6:
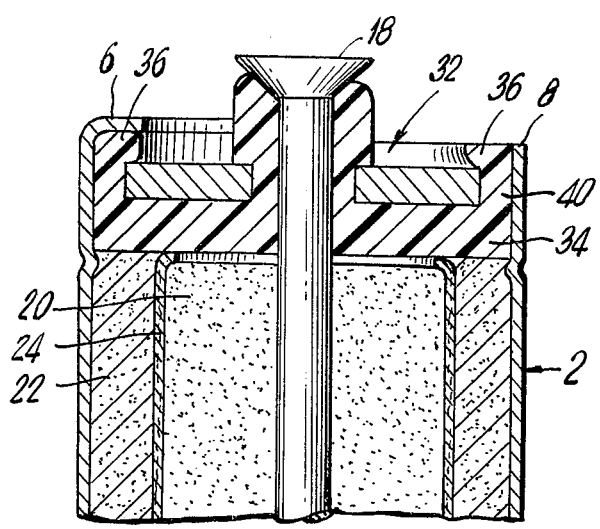
FIG. 6 is a sectional elevation of the container of FIG. 1 and the closure means of FIG. 5 shown assembled in a galvanic raw cell.

FIGS. 5 and 6 show another embodiment of a closure means 32 assembled in a cell in which the same components as shown in FIGS. 1 to 3 are identified with the same reference numbers. Specifically, the only difference in this embodiment is that the annular U-shaped gasket 34 has an inturned annular flange 36 extending from the peripheral skirt 40 which secures the cover 16 within the gasket 35. The assembly of closure means 32 in an alkaline manganese dioxide-zinc raw cell is shown in FIG. 6.

Figure 7:
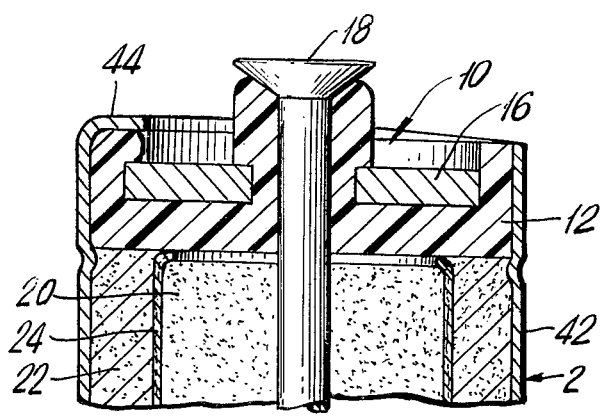
FIG. 7 is a sectional elevation of the closure means of FIG. 2 assembled in a modified container in accordance with this invention.
Figure 8:
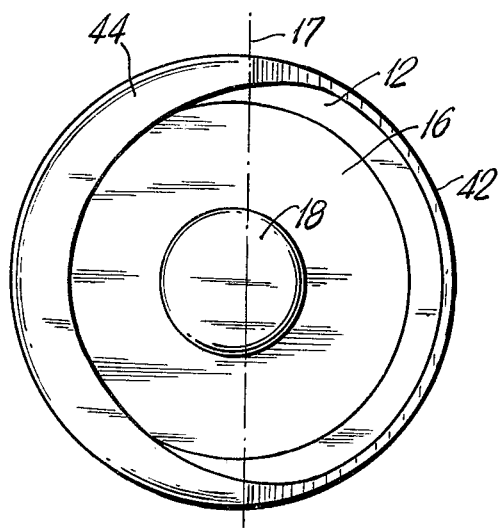
FIG. 8 is a plan view of the galvanic raw cell of FIG. 7.

FIGS. 7 and 8 show another embodiment of an alkaline manganese dioxide-zinc raw cell of this invention employing some of the same components as shown in FIGS. 1 to 3 and identified with the same reference numbers. Specifically, the only difference is that the upper peripheral edge of container 42 is cut at a slant beginning just over midway of the cell's diameter thereby producing an extended arc portion 44. This arc portion 44 is crimped over gasket 12 in the conventional manner thereby axially retaining the closure means 10 within the container 42 along arc portion 44 which spans just over 180° of the container's edge. Again this radially sealed closure means will provide an excellent vent for high pressure build up within the cell by tipping or tilting the closure means 10 about axis 17 in a manner as discussed above.

Figure 9:
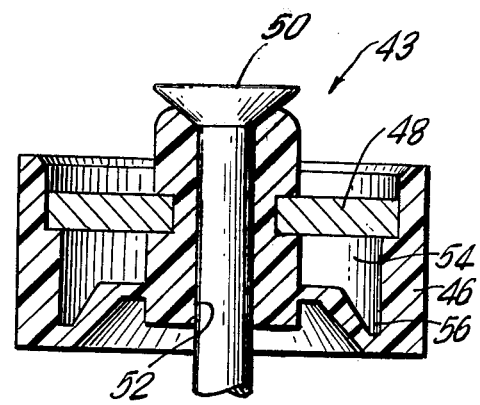
FIG. 9 is a sectional elevation of another embodiment of a closure means for use in this invention.

FIG. 9 shows another embodiment of a closure means 43 comprising an annular U-shaped gasket 46 with a recessed mounted cover 48 and an anode collector 50 radially secured within a central aperture 52. The U-shaped gasket 46 and cover 48 define an annular space 54 having a somewhat V-shaped recess 56. Using this type of structural design for gasket 46, and specifically the forming of recess 56, will provide a stress relief for the gasket 46 when it is radially sealed as discussed above. This will prevent possible cracking of the gasket during or following the sealing process.

It is to be understood that the level of internal pressure required to tip or tilt the closure means can vary depending on the tightness of the radial seal and the axial restraint which may be provided by the arc portion of the upper edge of the container that is not curled over the closure means. By varying either or both of these, the cell can be made to vent internal gas when it reaches a predetermined high level without completely projecting any of the cell's component parts out of the container.

Preferably the radially sealed raw cells of this invention can be made to vent gases after a pressure of 1,000 psi to 2,000 psi is developed within 0.3 inch diameter cylindrical cells. For larger diameter cells, similar closure means can be made to vent at lower internal pressure levels.

EXAMPLE

A plurality of 0.3 inch diameter cylindrical cells were produced as shown in FIG. 3 employing a maganese dioxide-containing cathode, a zinc-containing anode and a potassium hydroxide-containing electrolyte. The closure means used is shown in FIG. 2 and comprised a brass anode collector rod, a plastic gasket and a steel cover. Several lots of cells were subjected to abusive testing by charging each fresh cell under various currents as shown in the Table. The average time for the cells in each lot to vent under this abusive testing is shown in the Table. It was observed that in each of the cells tested, the closure means tipped or tilted about the diametral axis of the container after a high gas pressure level was developed whereupon the gas escaped between the gasket and the container proximate the peripheral edge of the container that was not curled over the gasket. This demonstrated the safety venting means of this invention whereupon high gas pressure was vented without any of the cell component parts being projected completely out of the cell's container. In each of the cells tested, the closure means remained an integral part of the cell by being secured at the peripheral edge of the container that was curled over the gasket. This test clearly demonstrated the safety aspects of this invention whereby high pressure gas levels developed in cylindrical cells can be safely vented.

TABLE

| Charge Current (ampere) | No of Cells/Lot | Average time to vent |
| --- | --- | --- |
| 0.25 | 36 | 5.1 minutes |
| 0.51 | 29 | 2.3 minutes |
| 1.01 | 19 | 1.17 minutes |
| 1.51 | 4 | 45 seconds |
| 2.0 | 3 | 43 seconds |

It is to be understood that other modifications and changes to the preferred embodiment of the invention herein shown and described can also be made without departing from the spirit and scope of the invention.

What is claimed is:

1. In a cylindrical galvanic cell comprising a container having an open end and an inner disposed active anode, active cathode, and electrolyte disposed within said container; a closure means for the container, said closure means comprising an annular cover disposed within an annular di-electric gasket having a U-shaped type cross section with the center of the gasket defining an opening; a current collector disposed through the central opening in the gasket and contacting the inner active member of the cell; and said container having an annular segment of its upper wall radially compressed against said cover via said gasket providing a seal thereat; the improvement wherein a first arc portion between about 150° and 190° of the top peripheral edge of the container defining an open end is curled over the gasket thereby further securing the closure means to the container along said first arc portion so as to enable a predetermined pressure buildup within the cell to tip the closure means thereby producing a vent passage between the closure means and the container proximal the remaining second arc portion of the top peripheral edge of the container while said closure means remains retained by said first arc portion.

2. In a cylindrical galvanic cell of claim 1 wherein the first arc portion is between about 170° and 180°.

3. In a cylindrical galvanic cell of claim 1 wherein the first arc portion is about 180°.

4. In a cylindrical galvanic cell of claim 1, 2 or 3 wherein the gasket does not overlap the cover along the second arc portion of the top peripheral edge of the container.

5. In a cylindrical galvanic cell of claim 1, 2 or 3 wherein the gasket overlaps the cover along the second arc portion of the top peripheral edge of the container.

6. In a cylindrical galvanic cell of claim 1, 2 or 3 wherein the cathode is manganese dioxide, the anode is zinc and the electrolyte is aqueous potassium hydroxide.

* * * * *